United States Patent Office 3,122,677
Patented Feb. 25, 1964

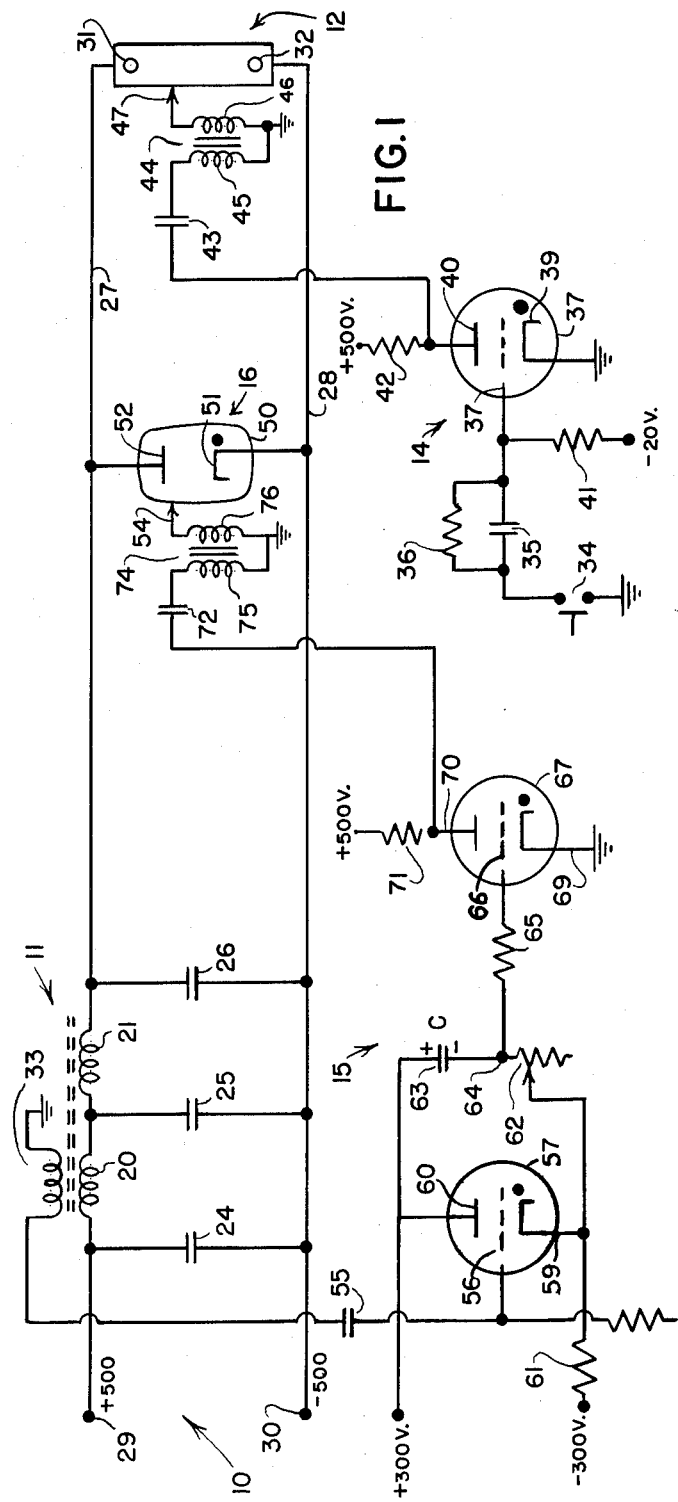
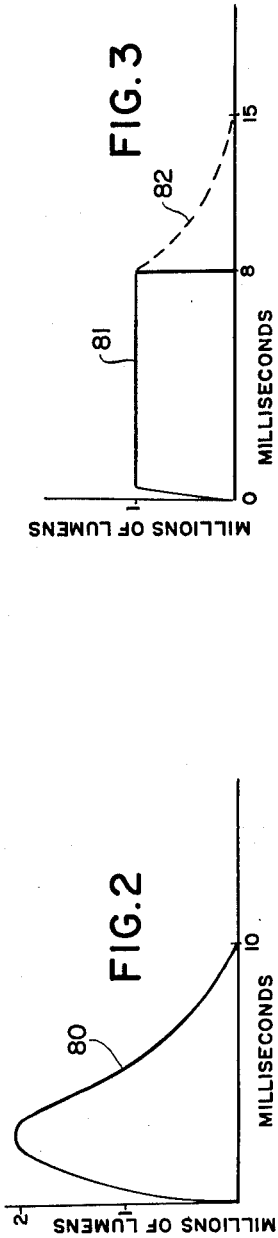

3,122,677
ELECTRIC FLASH PRODUCING SYSTEM HAVING SHUNTING MEANS TO TERMINATE FLASH AT DESIRED INSTANT
Robert A. Flieder, East Brunswick, N.J., assignor to American Speedlight Corporation, Middle Village, N.Y.
Filed Jan. 12, 1961, Ser. No. 82,347
11 Claims. (Cl. 315—241)

The present invention relates to electric flash producing systems, and more particularly to systems embodying electric flash devices, such as gaseous discharge tubes to produce a single flash or repetition of flashes for purposes including flash photography.

In a "drum" high speed camera, a short length of film is carried by a drum, and rotated at high speed past a lens which is focussed through a suitable shutter at an objective. Such cameras are used to photograph articles traveling at high speeds such as exploding objects, a bullet piercing the wall of a container, turbine blades bursting during high speed tests or similar things. It is necessary that a high constant intensity light be used for the duration of the film exposure which is of the order of 8 milliseconds. It is further necessary that the light source be cut off at the end of the film exposure so that double exposure does not occur.

An object of the invention is to provide an improved electrically operated light flash producing system particularly suitable for producing high intensity light flashes at intervals of the order of eight milliseconds in length.

In accordance with the invention a light pulse or flash of predetermined intensity and length is provided from stored energy discharged through a gaseous flash tube, the discharge being metered so that the light intensity is constant, means being provided to terminate the flash at a predetermined time.

Other objects and advantages of the invention will be apparent from the following description and from the accompanying drawing, which shows, by way of example, an embodiment of the invention.

In the drawings:

FIGURE 1 is a schematic wiring diagram of an electric discharge system in accordance with the invention.

FIGURE 2 is a curve showing the light producing characteristic of the usual light flash producing system.

FIGURE 3 is a curve showing the light producing characteristic of the electric discharge system in accordance with the invention.

Referring to the drawing there is shown in FIGURE 1 an electronic flash producing system in accordance with the invention and adapted to be connected to a direct power supply 10, and including energy storage means 11 to supply a flash tube 12 triggered by a conventional control circuit 14. The duration of the flash of light produced by the system is controlled by a circuit 15 including an electronic switch 16.

The energy storage means 11 is a pulse forming network including two or more inductors 20 and 21 connected in series with capacitors 24, 25 and 26 in a network arrangement in which the capacitors are connected across supply lines 27 and 28 leading from terminals 29 and 30 to the main electrodes 31 and 32 of the flash tube 12. The inductor 20 is provided with a pick up winding 33 to provide a control voltage as will be explained hereinafter. The network is designed to provide a discharge pulse with a flat top. The discharge pulse with a capacitor power supply is shown in FIGURE 2, and provides a high peak of short duration. The storage means 11 or network produces a discharge pulse as shown in FIGURE 3. The tail end of the discharge is shown dotted as will be later explained.

The flash tube 12 is of the type having its electrodes 31 and 32 disposed in a gaseous medium such as xenon within a light transparent quartz envelope, and is triggered by a conventional control circuit 14 including a switch 34 which may be hand operated, by a push button operated, or automatically operated, as by relay operation in conjunction with the shutter of a camera. The switch 34 is connected through a coupling capacitor 35 bypassed by a resistor 36 to grid 37 of a gas thyratron tube 38 having a cathode 39 and an anode 40. A grid leak 41 is connected from the grid 37 to a negative bias. The cathode 39 is grounded, while the anode 40 is connected through a resistor 42 to positive bias and to a triggering capacitor 43. A triggering transformer 44 has one end of its primary 45 and one end of its secondary 46 connected together and grounded. The other end of the primary 45 is connected to the triggering capacitor 43 and the other end of the secondary 46 is connected to a triggering electrode 47 of the flash tube 12.

In order to provide a light flash of a predetermined duration means are provided to sense the start of the flash and to extinguish or terminate it after the expiration of a predetermined time. This is accomplished by providing a discharge device of low impedance connected across the terminals of the flash tube so as to shunt energy away from the flash tube and dissipate the energy in the impedance device and in the wiring in series therewith. Electronic switching means 16 is used for this purpose, preferably a gas tube 50. The tube 50 has a low discharge impedance between its cathode 51 and its anode 52, and a high flashover voltage. The tube 50 is capable of being triggered at a low voltage by a triggering electrode 54.

The electronic switching means 16 is controlled by the circuit 15 which includes the pick up winding 33 adapted to produce a pulse responsive to current flow in the inductor 20. The pulse is transmitted through a coupling capacitor 55 connected to a grid 56 of a gas thyratron 57 having a cathode 58 and an anode 60. The cathode 59 is provided with negative bias through a resistor 61 and is connected to an adjustable resistor 62. The anode 60 is provided with positive bias and is connected to a capacitor 63 in series with the adjustable resistor 62, thereby forming a R-C circuit. Midpoint 64 between the resistor 62 and the capacitor 63 is connected through a resistor 65 to grid 66 of a gas thyratron 67 having a cathode 69 and an anode 70.

The triggering control of the electronic switching means 16 may be the same as for the flash tube 12, the tube 67 being connected in a circuit duplicating that for the tube 37. Thus, the cathode 69 of tube 67 is grounded and its anode 70 is connected through a resistor 71 to positive bias and to a triggering capacitor 72. A triggering transformer 74 has one end of its primary 75 and one end of its secondary 76 connected together and grounded. Other end of the primary 75 is connected to the triggering capacitor 72 and other end of the secondary 76 is connected to the triggering electrode 54 of the tube 51.

In the operation of the electric flash producing system in accordance with the invention it is connected to a source of electric current such as the direct current supply 10, and the capacitors 24, 25, and 26 are charged to operating potential. At the same time, the triggering capacitors 43 and 72 are charged, as is the capacitor 63 of the R-C circuit. Upon the closing of the switch 34, the triggering capacitor 43 is discharged through the triggering transformer producing a voltage at the triggering electrode 47 thereby causing the flash tube 12 to draw current from the storage means 11.

The flow of current in the inductor 20 causes the tube 57 to be triggered causing the R-C circuit including adjustable resistor 62 and capacitor 63 to discharge through the tube 57. The rate of discharge may be varied by adjustment of the resistor 62. Upon the discharge of the capacitor 63 there is a rise in the positive bias in the grid 66 of the tube 67 causing the tube to trigger and through triggering capacitor 72, transformer 74 and triggering electrode 54 to cause the tube 50 to fire. Inasmuch as the impedance of the tube 50 is low when fired, the remaining current in the energy storage means 11 is discharged and the flash tube 12 becomes extinguished because of lack of current.

In FIGURE 2 there is a curve 80 showing the flash of light produced by conventional capacitor power supplies. In FIGURE 3 there is shown a curve 81 for a flash of light as produced by the flash tube 12. It should be noted that curve 81 (in full line FIGURE 3) has a flat top and thus the light output is practically uniform throughout its duration. The network forming the energy storage means 11 has produced the flat or "squared" pulse as shown by curve 81 as distinguished from the peaked pulse as shown by curve 80. The tail 81 of the light pulse (in dotted line FIGURE 3) is cut off by the action of the electronic switch 16.

An electric flash producing system manufactured commercially and found to operate in a satisfactory manner employed constants for the circuit components as follows:

| Component | Value |
| --- | --- |
| Tubes 37, 57, 67 | 2D21. |
| Inductor 20 | 50 mh. |
| Inductor 21 | 100 mh. |
| Capacitor 24 | 2000 mfd. |
| Capacitor 25 | 500 mfd. |
| Capacitor 26 | 250 mfd. |
| Capacitor 35 | .01 mfd. |
| Resistor 36 | 100K ohms. |
| Resistor 41 | 1 megohm. |
| Resistor 42 | 100K ohms. |
| Capacitor 43 | .25 mfd. |
| Gas tube 50 | T416P Kemlite. |
| Capacitor 55 | .01 mfd. |
| Resistor 61 | 1 megohm. |
| Resistor 62 | 20K ohms. |
| Capacitor 63 | .35 mfd. |
| Resistor 65 | 1 megohm. |
| Resistor 71 | 100K ohms. |
| Capacitor 72 | 0.25 mfd. |

While the invention has been described and illustrated with reference to a specific embodiment thereof, it will be understood that other embodiments may be resorted to without departing from the invention. Therefore, the form of the invention set out above should be considered as illustrative and not as limiting the following claims.

I claim:

1. An electric flash producing system comprising an electric flash device, electric energy storage means, a discharge circuit connecting the energy storage means to the flash device, normally ineffective means diverting energy from the energy storage means operative to electrically by-pass the flash device thereby extinguishing the flash device, and control means rendering said last mentioned means ineffective.

2. An electric flash producing system comprising an electric flash device, electric energy storage means, a discharge circuit connecting the energy storage means to the flash device to produce a flash of light, pulse squaring means in the discharge circuit, and pulse length clipping means predetermining the duration of the flash of light.

3. An electric flash producing system comprising an electric flash device, electric energy storage means, a discharge circuit connecting the energy storage means to the flash device to produce a flash of light, pulse squaring means in the discharge circuit, electronic switching means connected across the electric energy storage means operative to electrically by-pass the flash device, and control means for the switching means thereby terminating the period of the flash.

4. An electric flash producing system comprising an electric flash device including a pair of main electrodes and a trigger electrode, electric energy storage means, a charging circuit for the energy storage means, a discharge circuit for the energy storage means connected to the main electrodes, a discharge control network connected in the discharge circuit, means for supplying a trigger impulse to the trigger electrode to initiate discharge of the flash device to produce a flash of light, and means predetermining the duration of the flash of light by electrically by-passing energy from the energy storage means.

5. An electric flash producing system comprising an electric flash device including a pair of main electrodes and a trigger electrode, electric energy storage means, a charging circuit for the energy storage means, a discharge circuit for the energy storage means connected to the main electrodes, a discharge control network connected in the discharge circuit, means for supplying a trigger impulse to the trigger electrode to initiate discharge of the flash device to produce a flash of light, normally ineffective means for diverting energy from the energy storage means so that the flash device is extinguished, and means rendering said last mentioned means effective.

6. An electric flash producing system comprising an electric flash device including a pair of main electrodes and a trigger electrode, electric energy storage means, a charging circuit for the energy storage means, a discharge circuit for the energy storage means connected to the main electrodes, a discharge control network connected in the discharge circuit thereby regulating the intensity of light produced by the flash device, means for supplying a trigger impulse to the trigger electrode to initiate discharge of the flash device, an electronic switch including a pair of principal electrodes and a control electrode, the principal electrodes of the electronic switch connected in parallel with the main electrodes of the flash device, a control circuit for the control electrode including delay means, and means responsive to the flow of current in the discharge circuit for actuating the delay means, so that the electronic switch is actuated a predetermined interval after the initiation of the flash device thereby terminating the period of the flash.

7. An electric flash producing system comprising an electric flash device including a pair of main electrodes and a trigger electrode, electric energy storage means, a charging circuit for the energy storage means, a discharge circuit for the energy storage means connected to the main electrodes, a discharge control network connected in the discharge circuit thereby regulating the intensity of light produced by the flash device, means for supplying a trigger impulse to the trigger electrode to initiate discharge of the flash device, an electronic switch including a pair of principal electrodes and a control electrode, the principal electrodes of the electronic switch connected in parallel with the main electrodes of the flash device, a control circuit for the control electrode including load current flow sensing means, a R-C circuit, switch means responsive to the load current flow sensing means operative to discharge the R-C circuit, trigger switch means for the control electrode of the electronic switch responsive to the potential of the R-C circuit so that the electronic switch is actuated a predetermined interval after the initiation of the flash device thereby terminating the period of the flash.

8. An electric flash producing system comprising an electric flash device including a pair of main electrodes and a trigger electrode, electric energy storage means, a charging circuit for the energy storage means, a discharge circuit for the energy storage means connected to the main electrodes, a discharge control network connected in the discharge circuit thereby regulating the intensity of light produced by the flash device, means for supplying a trigger impulse to the trigger electrode to initiate discharge of the flash device, an electronic switch including a pair of principal electrodes and a control electrode, the principal electrodes of the electronic switch connected in parallel with the main electrodes of the flash device, a control circuit for the control electrode including load current flow sensing means, a R-C circuit, trigger switch means for the control electrode of the electronic switch responsive to the potential of the R-C circuit so that the electronic switch is actuated a predetermined interval after the initiation of the flash device thereby terminating the period of the flash.

9. An electric flash producing system comprising an electric flash device including a pair of main electrodes and a trigger electrode, electric energy storage means, a charging circuit for the energy storage means, a discharge circuit for the energy storage means connected to the main electrodes, a discharge control network including a choke and a capacitor connected in the discharge circuit thereby regulating the intensity of light produced by the flash device, means for supplying a trigger impulse to the trigger electrode to initiate discharge of the flash device, an electronic switch including a pair of principal electrodes and a control electrode, the principal electrodes of the electronic switch connected in parallel with the main electrodes of the flash device, a control circuit for the control electrode a current transformer on the choke forming load current flow sensing means, a R-C circuit, switch means responsive to the load current flow sensing means operative to discharge the R-C circuit, trigger switch means for the control electrode of the electronic switch responsive to the potential of the R-C circuit so that the electronic switch is actuated a predetermined interval after the initiation of the flash device thereby terminating the period of the flash.

10. An electric flash producing system comprising an electric flash device including a pair of main electrodes and a trigger electrode, electric energy storage means, a charging circuit for the energy storage means, a discharge circuit for the energy storage means connected to the main electrodes, a discharge control network connected in the discharge circuit thereby regulating the intensity of light produced by the flash device, means for supplying a trigger impulse to the trigger electrode to initiate discharge of the flash device, an electronic switch including a pair of principal electrodes and a control electrode, the principal electrodes of the electronic switch connected in parallel with the main electrodes of the flash device, a control circuit for the control electrode including load current flow sensing means, a R-C circuit, a gas thyratron connected in series with the control electrode of the electronic switch and controlled by the discharge of the R-C circuit so that the electronic switch is actuated a predetermined interval after the initiation of the flash device thereby terminating the period of the flash.

11. An electric flash producing system comprising an electric flash device including a pair of main electrodes and a trigger electrode, electric energy storage means, a charging circuit for the energy storage means, a discharge circuit for the energy storage means connected to the main electrodes, a discharge control network connected in the discharge circuit thereby regulating the intensity of light produced by the flash device, means for supplying a trigger impulse to the trigger electrode to initiate discharge of the flash device, an electronic switch including a pair of principal electrodes and a control electrode, the principal electrodes of the electronic switch connected in parallel with the main electrodes of the flash device, a control circuit for the control electrode including load current flow sensing means, a R-C circuit, a first gas thyratron connected across the R-C circuit and controlled by the load current flow sensing means, a second gas thyratron connected in series with the control electrode of the electronic switch and controlled by the discharge of the R-C circuit so that the electronic switch is actuated a predetermined interval after the initiation of the flash device thereby terminating the period of the flash.

References Cited in the file of this patent

UNITED STATES PATENTS

| | | |
|---|---|---|
| 2,310,092 | Knowles | Feb. 2, 1943 |
| 2,470,895 | Marlowe | May 24, 1949 |
| 2,485,037 | Clark | Oct. 18, 1949 |
| 2,509,005 | Lord | May 23, 1950 |